US008515418B2

(12) United States Patent
Weintraub et al.

(10) Patent No.: US 8,515,418 B2
(45) Date of Patent: Aug. 20, 2013

(54) MOBILE ROAMING PREPAID SOLUTIONS

(75) Inventors: Guy Weintraub, Ramat-Gan (IL); Shai Ophir, Moshav Ein-Vered (IL); Ory Biran, Kiryat-Tivon (IL); Derek McElhinney, Co. Sligo (IE); Itzhak Ben-Yehuda, RaAnana (IL)

(73) Assignee: StarHome GmbH, Zurich (CH)

( * ) Notice: Subject to any disclaimer, the term of this patent is extended or adjusted under 35 U.S.C. 154(b) by 1514 days.

(21) Appl. No.: 11/797,456

(22) Filed: May 3, 2007

(65) Prior Publication Data

US 2007/0259663 A1 Nov. 8, 2007

Related U.S. Application Data

(60) Provisional application No. 60/847,994, filed on Sep. 29, 2006, provisional application No. 60/835,099, filed on Aug. 3, 2006, provisional application No. 60/816,595, filed on Jun. 27, 2006, provisional application No. 60/796,896, filed on May 3, 2006.

(51) Int. Cl.
*H04W 4/00* (2009.01)

(52) U.S. Cl.
USPC .......... 455/432.1; 455/432.2; 455/432.3; 455/433; 455/434

(58) Field of Classification Search
USPC .......... 455/422.1, 433, 432.1, 432.2, 432.3, 455/434
See application file for complete search history.

(56) References Cited

U.S. PATENT DOCUMENTS

| | | | |
|---|---|---|---|
| 2001/0000777 A1 | 5/2001 | McGregor et al. | |
| 2006/0252425 A1* | 11/2006 | Jiang | 455/432.1 |

FOREIGN PATENT DOCUMENTS

| | | |
|---|---|---|
| WO | WO 00/22871 | 4/2000 |
| WO | WO 00/41486 | 7/2000 |
| WO | WO 01/49060 | 7/2001 |
| WO | WO 01/63897 | 8/2001 |
| WO | WO 2004/084563 | 9/2004 |
| WO | WO 2007/129315 | 11/2007 |

OTHER PUBLICATIONS

Office Action Dated Jun. 17, 2012 From the Israel Patent Office Re. Application No. 194989 and Its Translation Into English.
International Preliminary Report on Patentability Dated Nov. 13, 2008 From the International Bureau of WIPO Re.: Application No. PCT/IL2007/000546.
Communication Pursuant to Article 94(3) EPC Dated Nov. 25, 2009 From the European Patent Office Re.: Application No. 07736286.1.
International Search Report and the Written Opinion Dated Nov. 6, 2007 From the International Searching Authority Re.: Application No. PCT/IL2007/000546.
Response Dated Mar. 10, 2010 to Communication Pursuant to Article 94(3) EPC of Nov. 25, 2009 From the European Patent Office Re.: Application No. 07736286.1.

\* cited by examiner

*Primary Examiner* — Manpreet Matharu

(57) ABSTRACT

A client for inclusion in a mobile telephony apparatus barred from international roaming usage, to allow roaming operation thereof according to conditions determined at a home network, the client being configured with: an activation unit configured to switch said client between active and passive states, and a call control unit, operative in said active state, to communicate with a predetermined node at said home network, to facilitate control of said mobile telephony apparatus using said home network determined conditions. There is also provided a server component at the home network to support the client. The system allows CAMEL type services when a prepaid roaming user is roaming in a non-CAMEL enabled network, and even allows these services to be provided when the home network lacks CAMEL enablement.

31 Claims, 13 Drawing Sheets

MOBILE ROAMING PREPAID SOLUTIONS

RELATIONSHIP TO EXISTING APPLICATIONS

The present Application claims priority from U.S. Provisional Patent Application Nos. 60/796,896 filed on May 3, 2006; 60/816,595 filed on Jun. 27, 2006; 60/835,099 filed on Aug. 3, 2006 and 60/847,994, filed on Sep. 29, 2006, the contents of which are hereby incorporated by reference.

FIELD AND BACKGROUND OF THE INVENTION

The present invention relates to prepaid solutions for mobile roaming and, more particularly, but not exclusively to such solutions that involve the SIM toolkit, that allow text messaging only, and solutions that work in networks that are not enabled with CAMEL.

Today, roaming use of mobile telephones is widespread and subscribers have come to expect that their telephones will work wherever they are located. As long as the user is a postpaid user, that is he uses the telephone and then subsequently receives the bill and pays the charges then the roaming network need merely record the usage and subsequently send the data to the home network which can then bill the subscriber. However prepaid users pay in advance and are only able to use their telephones while their accounts are in credit. This raises a problem with roaming because the roaming network then has to know about the credit status of the prepaid subscriber before it can allow the call, and of course the information is stored at the home network. Thus the default position for roaming prepaid subscribers is to bar them from roaming use.

There are a number of solutions for the roaming prepaid mobile subscribers, that is mobile prepaid users who roam in a foreign mobile network. The most popular solution is based on the CAMEL standard. CAMEL is an acronym of Customised Applications for Mobile networks Enhanced Logic, and is a set of GSM standards designed to work on a GSM core network. They allow an operator to define services over and above standard GSM services. The CAMEL architecture is based on the Intelligent Network (IN) standards, and one of the services most commonly provided is to issue triggers for prepaid roamers which reach the home network and operate the home-network based prepaid system to govern the call. The triggers ensure that the home prepaid system is aware of the call as if it were taking place on the home network and the home prepaid system is therefore able to inform the roaming network whether the prepaid subscriber has credit for the call and when the credit runs out.

Another solution is based on USSD call-back. The prepaid subscriber sends a USSD message to a preset telephone number and a callback is arranged.

Neither of the above solutions is perfect. The CAMEL solution requires that both the home network (HPMN) and the roaming network (visited network—VPMN) support CAMEL and has CAMEL integration in place and a CAMEL roaming agreement between them. CAMEL support costs a fair amount of money for the mobile operator, and not all operators have installed this feature. The USSD solution has a usability issue in that the message has to be dialed in a special way, and not all subscribers are ready or willing to make use thereof. Also certain networks bar USSD messages.

It would be desirable to provide a solution for the roaming prepaid issue, which is (a) transparent to the end user, i.e. the user is able to dial as usual, and (b) makes use of the existing CAMEL solution where available, that is if the CAMEL solution is available then CAMEL will be made use of, any new solution coming into action when there is no other option available.

One of the issues in today's roaming mobile market is the complexity of offering subscribers full roaming services. It is possible to offer a complete range of solutions so that subscribers can be provided with the usage they desire from their mobile handsets. However, due to possible exposure to fraud, Operators often wish to limit the usage of their roamers. One of the limits operators seek to place on their subscribers is to bar roaming users from making voice calls.

Now, today's situation is that roamers, once barred from making calls are also automatically barred from sending text messages, such as SMS. However allowing text messaging involves much less exposure to fraud and operators wish to allow text messaging even when calls are barred. However once the telephone is barred, it is barred for all usage.

Prepaid or pay-as-you-go mobile services have created a new business model and service process for operators. Customer loyalty in the prepaid mobile subscriber segment is currently based on cost. Over time, key services such as prepaid roaming may be a more effective means of securing long-term prepaid business.

There is thus a widely recognized need for, and it would be highly advantageous to have, a roaming system which is devoid of the above limitations.

SUMMARY OF THE INVENTION

According to one aspect of the present invention there is provided a client for inclusion in a mobile telephony apparatus barred from international roaming usage, to allow roaming operation thereof according to conditions determined at a home network, the client being configured with:

an activation unit configured to switch said client between active and passive states, and a call control unit, operative in said active state, to communicate with a predetermined node at said home network, to facilitate control of said mobile telephony apparatus using said home network determined conditions.

According to a second aspect of the present invention there is provided a client for installation in a mobile telephony apparatus, the client being configured with:

a communication categorization unit for distinguishing between different categories of communication at said apparatus, and a communication blocking unit associated with said categorization unit for blocking communications according to at least a first category of communication and allowing communications according to at least one other category of communication.

According to a third aspect of the present invention there is provided a home network roaming user apparatus, for call control of roaming users, the apparatus comprising:

a status switching unit for switching an international call barring status of a mobile telephony unit determined to have a call control client, and a network call control unit for applying control to a call placed by said mobile telephony unit based on signaling received from said call control client.

According to a fourth aspect of the present invention there is provided a method for controlling roaming mobile telephony devices comprising:

detecting placement at said roaming mobile telephony device of a call, said detecting being at a call control client of said roaming mobile telephony device;

in response to said detecting, sending from said call control client to a predetermined address at a home network of said mobile telephony device information regarding said call, said information being for enabling said home network to limit a duration of said call in accordance with user data held at said home network.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
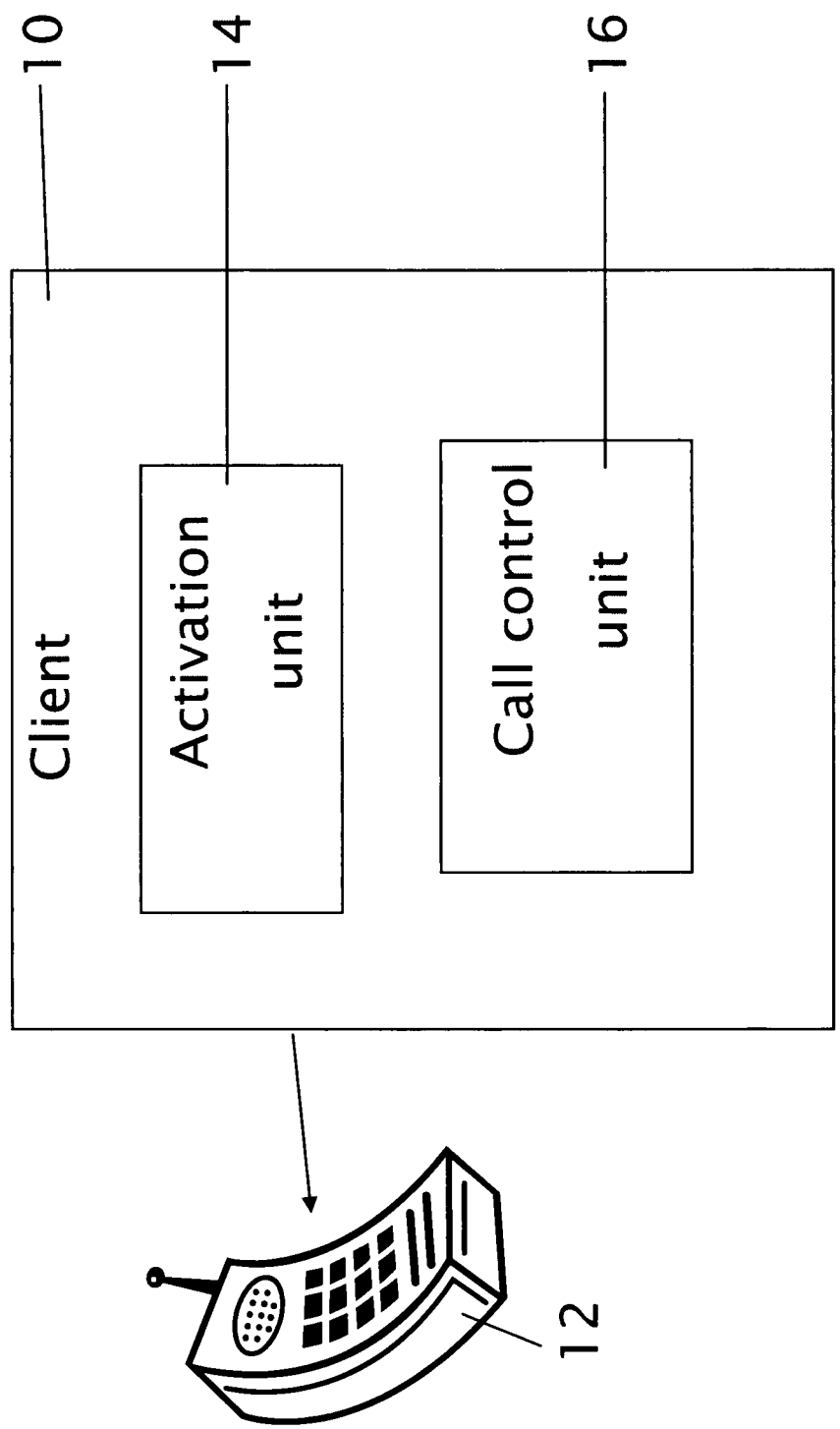
FIG. 1 illustrates a first embodiment of a client according to the present invention.

The present embodiments comprise an apparatus and a method for enhancing the ability to control a roaming user from a home network. In particular there is provided a way of controlling roaming calls placed by a prepaid user so that the call is governed by the prepaid system at the home network, which is the only location that knows whether the current user has a positive balance. The solution uses a client placed at the mobile device to detain the call before forwarding and then forward the call directly to a server at the home network. The server at the home network is then able to do two things. Firstly the server is able to pass control of the call to the home-based prepaid call system, and secondly the home network is able to remove the automatic bar to International dialing that is automatically placed on roaming users, before the call is then forwarded to the destination. In fact call barring may be removed altogether for the given telephone or may be removed per call, on condition that the telephone has the appropriate user client.

In another solution the call is dealt with as usual but a client at the roaming telephone also sends triggers to the home network which mimic the effect of CAMEL triggers. A home network which is CAMEL enabled may then treat the call as coming from a CAMEL enabled roaming network. In the case that the home network is not CAMEL enabled, the solution allows the server to manage the triggers received and forward them to the prepaid system.

In a third solution a dialed call is held by the client and a message is sent to the server at the home network. The server unbars the telephone for the duration of a single call and then the call is placed via the server so that the call can be governed by the home network prepaid system.

In a further solution the International dialing bar is removed as with any of the methods above but the client itself prevents calls being placed. However the client distinguishes between different kinds of communications and allows certain types of communication such as text messaging.

The above solutions allow full and partial prepaid roaming use in those roaming networks which have not installed their own support for such users via Intelligent Network and CAMEL. Such is possible irrespective of whether the home network has CAMEL installed.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which illustrates a client 10 for placing or incorporating in a mobile telephone 12. The telephone 12 is typically barred from international roaming usage, for example because it is a prepaid user and the roaming network cannot check the user's credit. The client overcomes this difficulty as will be explained below and thus enables roaming operation of the telephone according to conditions determined at the home network, such as the user's current prepaid credit level.

The client 10 may comprise an activation unit 14 which switches on the client between active and passive states, say when the mobile telephone device 12 enters a roaming state, or more specifically when it enters a roaming state within a network that is not set up for CAMEL or any like Intelligent Network protocol for managing prepaid users.

The client further includes a call control unit 16, which communicates with a predetermined location at the home network, to facilitate control of the mobile telephone using conditions determined at the home network such as the user's prepaid credit level.

For telephones equipped with the client, it is possible to switch off the bar to International calling that is generally placed on prepaid users.

In one such embodiment a call is placed at the telephone but instead of being forwarded to the destination as usual the call is intercepted by the client and forwarded to a predetermined telephone number, which may typically be a roaming gateway at the home network. That is to say the call control unit 16 replaces a dialed number with a predetermined number. As will be explained below, the predetermined number, referred to below as a DID number, may be fixed in advance or may be assigned dynamically.

In a variation, the call control unit 16 is further configured to send the dialed number in a communication separate from the call to the same DID number. The node reached using the DID number then matches the communication with the received call and forwards the received call using the dialed number, to reach the final destination.

The predetermined phone number may be preset in the client or it may be sent to the client as part of the call set up procedure.

In one embodiment the call control unit both forwards the call and sends the communication together. In another embodiment however the communication is sent first to remove the International call bar, and only then is the communication forwarded. This second embodiment ensures that the International bar is kept for the telephone and only removed after the receipt of a suitable communication and for the duration of a single call. Such an embodiment provides additional security against roaming fraud.

The communication, which is separate from the call itself, may be a text message or a USSD message. In one embodiment the message is simply an SS7 international signaling message. It is noted that some networks block USSD messages, so non-USSD methods are useful.

In yet another embodiment the call is forwarded from the client in the normal way to the final destination and is not sent via any intermediate destination. However the call is accompanied by communications which comprise triggers indicating call status. The triggers are used directly or indirectly to operate a prepaid system associated with the home network. The conditions for allowing the call to continue are then based on determinations made by said prepaid system, such as whether the user has sufficient credit.

If the home network is CAMEL enabled then the triggers can be used directly by the home network CAMEL system to operate the prepaid system. If the home network is however not CAMEL enabled then the intermediate destination reached by the DID number may translate the triggers into a format that can be used to operate the prepaid system.

Client 10 is in one embodiment a SIM toolkit application, which can be installed on the SIM card when provided to the subscriber, or uploaded into the SIM card at a later stage. Uploading may be manual or may be carried out over the air using the SIM Over The Air (OTA) protocol. Alternatively the client may be a Symbian application, a Brew application, a Microsoft Mobile application, or a Linux application, or an application running on any other platform used in mobile telephony devices.

Figure 2:
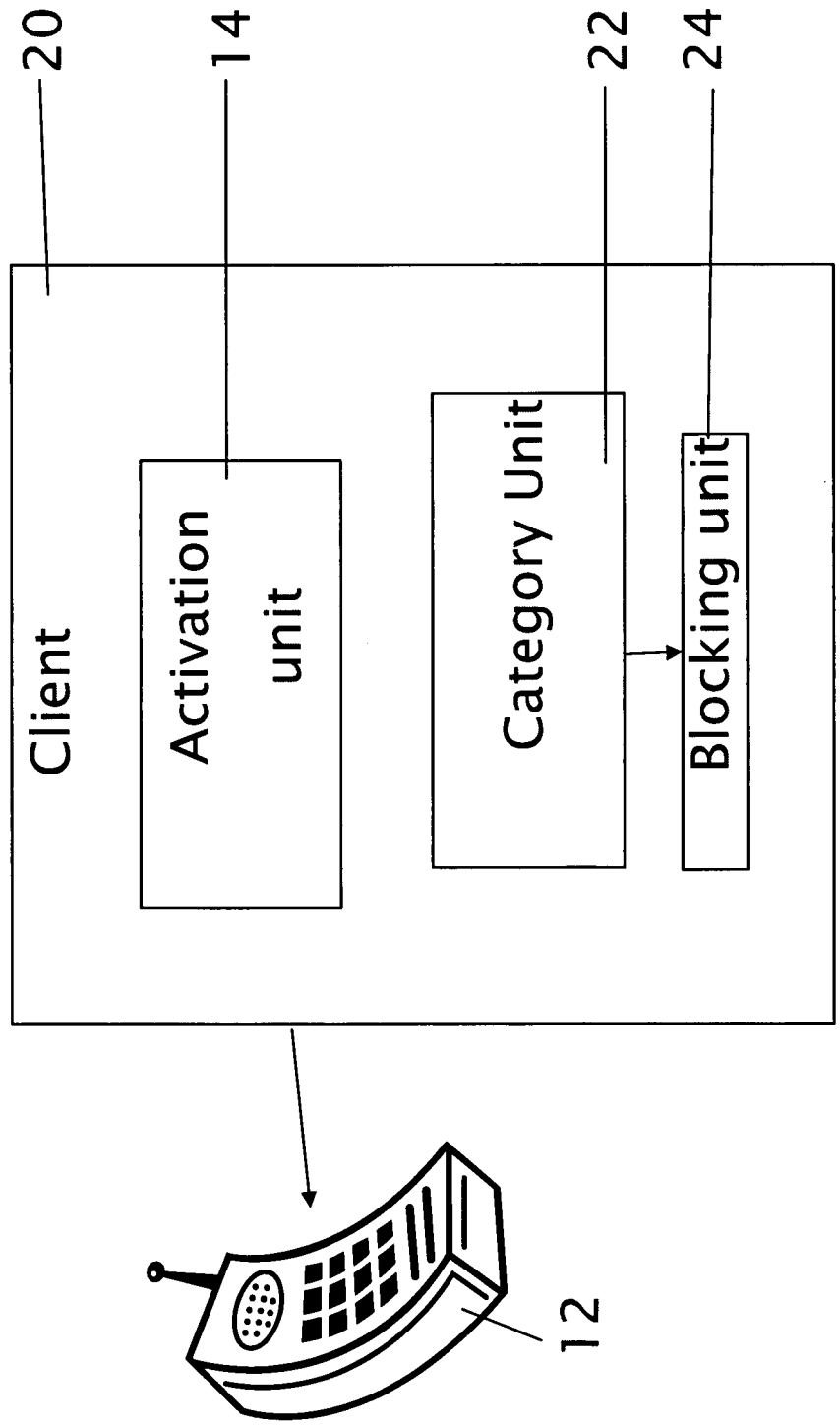
FIG. 2 illustrates a second embodiment of a client according to the present invention.

Reference is now made to FIG. 2, which illustrates an alternative client 20 for use with a roaming mobile telephony unit 12. The alternative client 20 actually identifies and bars calls at the roaming network but allows text messaging. Thus a mobile telephone 12 which is prepaid, or which for any other reason it is not desired to leave open for International calls, does not have to be barred from making International calls. The client itself can intercept, identify and prevent International voice calls but may for example allow text messages. Thus such a mobile telephone remains useful to its owner when traveling, without running up large debts to the user or presenting a credit risk to the service provider.

Client 20 comprises a communication categorization unit 22 for distinguishing between different categories of communication at the telephone 12, say voice call and text message. The client also includes a communication blocking unit 24 which blocks those communications according to one of the categories, typically the voice call. The text messages, being much cheaper, and thus being less of a risk to the service provider, are allowed through.

Again, client 20 can be remotely activated when roaming is detected, or when roaming at a non-CAMEL enabled network is detected. Activation unit 14 may be present to deal with activation issues.

Figure 3:
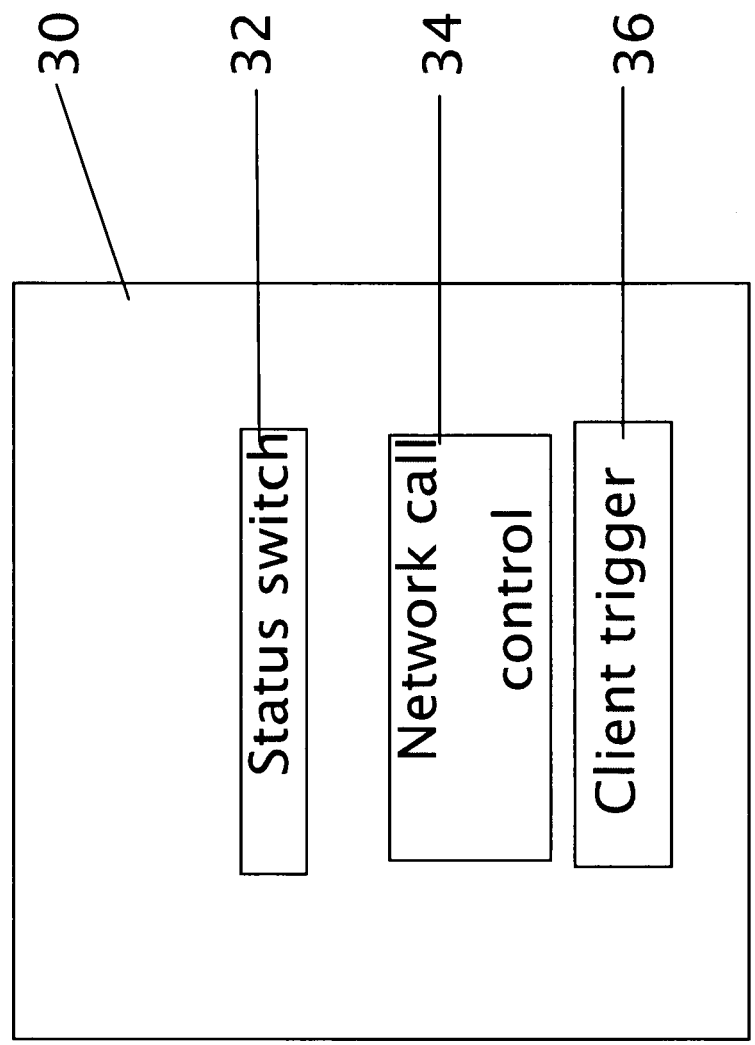
FIG. 3 illustrates a server according to a preferred embodiment of the present invention.

Reference is now made to FIG. 3, which is a simplified diagram illustrating apparatus 30 at the home network for responding to the client 10 and allowing the home prepaid system to control a call at a non-CAMEL enabled roaming network. The apparatus includes a status switching unit 32 which switches international call barring on and off for a mobile telephony unit. In particular a unit entering roaming which is determined to have a call control client such as client 10 or client 20 may have its call barring status cancelled so that calls are allowed. As explained, this may be done once at initial registration in a roaming network, or it may be done separately for each call. In addition, a network call control unit 34 may then communicate with a prepaid call system or the like to control the roaming call based on the prepaid system. As a result the prepaid system can operate on the home network in the normal way, but nevertheless control a call based on signaling received from the call control client 10 or 20. The signaling may be in the form of triggers which are directly CAMEL compatible and thus can operate the prepaid system. Such is useful if the home network is CAMEL compatible. Alternatively the signals may be adapted at the home network, typically at the roaming gateway, to operate the prepaid system. Thus latter alternative is useful if the home network is not of itself CAMEL compatible.

The apparatus 30 may include a triggering unit 36 to activate or trigger call control clients of mobile telephony units detected to be roaming, to place the clients in an active state.

As explained, instead of a trigger, the call control unit may receive the telephone call and a separate communication. The separate communication may be sent in advance of the call, in which case it may be used to operate the status switch unit to undo call barring. Then the call is forwarded to the apparatus where the original dialed number is extracted from the communication and the call is forwarded to the extracted number. The apparatus communicates with the prepaid system to ensure that the user has sufficient credit.

In another embodiment call barring is removed when the telephone first enters the roaming state. The call and the communication are forwarded together to the apparatus. The destination number is then extracted from the communication as before to forward the call to the destination.

The telephone of a prepaid user is typically barred from International calling at non-CAMEL networks by the fact that the Prepaid indication appears on the user profile at the serving VLR. The status switching unit may switch the status by adding or removing the Prepaid indication from the profile. This can be done by sending a new profile to the serving VLR, via the MAP Insert Subscriber Data (ISD) command.

In one embodiment the user client is based on a SIM toolkit applet. The applet is triggered by the SIM Call Control event EVENT_CALL_CONTROL_BY_SIM, as described by the 3GPP ETSI standard TS 03.19 (for example version 8.5.0 Release 1999, which is related to Java SIM cards, but can be implemented for any SIM toolkit supporting call control events).

The SIM Toolkit has numerous features which can be utilized in any applet. These features can be classified into different categories as follows:

Control of the Man-Machine Interface
Communication services
Menu management and application control
Accessory management
Miscellaneous The SIM Toolkit defines how the SIM card itself may interact with the outside world and extends the communication protocol between the card and the handset, that is the mobile telephone itself. Using applets based on the toolkit enables the card to have a proactive role in the handset. Thus the SIM card is able to initiate commands independently of the handset and the network.

The SIM applet may use a SIM call control event to obtain control of any call made by the user, that is to say a mobile originated or MO call while in roaming. The SIM applet is able to know whether the user is in roaming by comparing the current network identification taken from the LOCI file to the home network identification, as stored in the SIM applet. As explained elsewhere the SIM can alternatively be triggered remotely from the home network upon detection of roaming registration. The SIM applet would be able to determine if it is roaming but it would not typically be able to determine whether the current network is CAMEL enabled or not.

If the user is roaming, and an MO call is placed then in one embodiment the SIM applet preferably does the following:

1. Sends a USSD or text message to the home network, and to a pre-defined number, the number being associated with a service platform. The message preferably contains the original number dialed by the user, along with the current VLR number and possibly other parameters.

2. Modifies the dialed number to a pre-allocated number of the home network. This number can be a fixed personalized number, or a dynamic number composed from information received from the home service platform, via the USSD Ack or Acknowledgement.

Prior to the above two-step procedure, the service platform located at the home network, may turn the user from a prepaid user to a post paid user, in order to allow her to place the international calls in the first place. Generally a prepaid user is automatically barred from making the calls in the first place unless the network is set up to deal with such callers.

The service platform, now monitors the MAP International Links at the home network, using an SS7 probe, and specifically looks for a MAP Update Location Request, which is the registration event of the roaming user at the roaming network. If the user is roaming in a network with no CAMEL support, or any other equivalent solution, then the service platform sends an ISD (Insert Subscriber Data) message to the roaming VLR, turning the user from a prepaid user to a post paid for that specific VLR/Network. Changing user preferences is described for example in Starhome U.S. patent application Ser. No. 11/190,930, the contents of which are hereby incorporated by reference.

The home service platform now receives
(1) a USSD message, and
(2) a call targeting a specific personalized destination.

The platform matches between the message and the call, based on the call destination and the information stored in the USSD, which would be the IMSI or MSISDN of the user, the international system telephone numbers given to the roaming users, as well as relevant information stored in the service platform. For example the number may have been dynamically allocated to the user via the USSD Acknowledgement. The call itself may reach the service platform via ISUP, INAP or in ISUP signaling it is possible to use 'loop back'. Other telephony interfaces may also be available.

The service platform may then communicate with the prepaid system, installed at the home network, acting as an SSP. The prepaid system is typically implemented as a service control point or SCP. The service platform uses the CAMEL protocol if the prepaid SCP is a CAMEL SCP, so that the service is transparent to the prepaid system. That is to say the prepaid system itself operates as usual, as in a regular CAMEL scenario. Alternatively, the service platform can use INAP or any other prepaid interface.

Under control of the prepaid SCP, if the user has sufficient balance, the service platform will continue the call to its original destination, by placing an additional telephony leg, or by sending a 'connect' reply to the INAP trigger, or by any other telephony call control means. The service platform controls the call, by managing the interface with the prepaid system for the duration of the call, and by disconnecting the call if the user account runs out of resources.

Fraud Prevention

The system described above relies on the activity of the client to allow the home network to remove the ban on International calls. In principle therefore if one can convince the home network that the client is in place but in fact somehow remove its effect then there is an opening for fraud. In order to prevent fraud, for example of the kind described above, another SIM applet may be installed on the SIM card. Alternatively the original SIM applet may be extended for the same effect.

In a fraud prevention embodiment, the applet preferably sends a USSD message to the service platform whenever the user is registered in a roaming VLR. The USSD contains the IMEI (International Mobile Equipment Identity) of the handset, a number unique to the handset which can be obtained by the SIM applet. The service platform in any event always receives a USSD following the roaming registration to every roaming VLR. The lack of a USSD message carrying the IMEI may therefore cause the service to terminate, and the user is returned to the status of a prepaid user once again. The restoration of status is preferably achieved by sending another ISD message to the roaming VLR. The platform may wait for a few seconds for this IMEI bearing USSD message before locking the service.

The platform may also receive the IMEI, and compare it with its own copy of the IMEI stored in its user database. Such would ensure that the SIM card supporting the currently communicating is not installed in a SIM Array machine, or any similar fraud-enabling equipment.

If the SIM has somehow become installed in another mobile handset, the platform may check whether the new mobile handset supports the required call control capabilities.

Such a check may be based on an IMEI information database also stored at the platform. If the new handset is not capable of supporting such a service, or there is any question mark regarding its functionality, the platform may eliminate the service for the user, and restore her previous status as a prepaid roaming subscriber.

Service Description

The service is now considered in more detail. In non CAMEL networks the pre-paid roamer is initially registered as postpaid, enabling the Roamer to place calls. The call control and budget control are carried out by means of a SIM Applet communicating with an intelligent gateway or IntelliGate platform located at the home network via SMS or USSD messages. The IntelliGate may in turn be responsible for passing the call information onto the operator's prepaid system using its Pre-paid SCP native language (i.e. CAP/INAP).

This change of a users status from Prepaid to Postpaid may be transparent to the end user. The only requirement is that the mobile phone and SIM card support the SIM application toolkit. As mentioned, other operating systems may be used in place of the SIM toolkit where applicable.

The IntelliGate may passively monitor all the international signaling traffic. Every Location Update (UL) Request, received at the Intelligate from roamers, may be analyzed and the service logic, as outlined below, then applied.

Service Logic

Upon receiving a Location Update (LU) the IntelliGate may check if the service is required at the current visited network. Such a check may be made according to a pre-defined list, and in conjunction with a service provisioning tool.

If the visited network has not been preconfigured to support the service, the IntelliGate may do nothing. That is it may not send an altered ISD and not check the SIM applet.

If the visited network has been pre-configured to support the client based prepaid service of the present embodiments, the IntelliGate may first of all check/verify the SIM applet(s) on the prepaid subscriber's telephone. Then the IntelliGate may alter the ISD (Insert Subscriber Data) in the VLR, thus actually changing the status, then allowing the subscriber to use their telephone in the normal way.

However the calls still have to be controlled. To allow the HPMN or home network to control the roamers calls, the SIM applet, the client as discussed above, is used. The SIM applet is responsible for notifying the IntelliGate of all calls made by the roamer. The IntelliGate passes the call information onto the prepaid system so it can debit the users account. The IntelliGate can then disconnect the roamer's call if they exceed their credit.

The system may comprise some of the following features:
  The IntelliGate operates in passive mode architecture i.e. probing,
  A GUI for service provisioning,
  Counters for report generation,
  SNMP traps for service and system monitoring, and
  VPMN definition for service activation.

Figure 4:
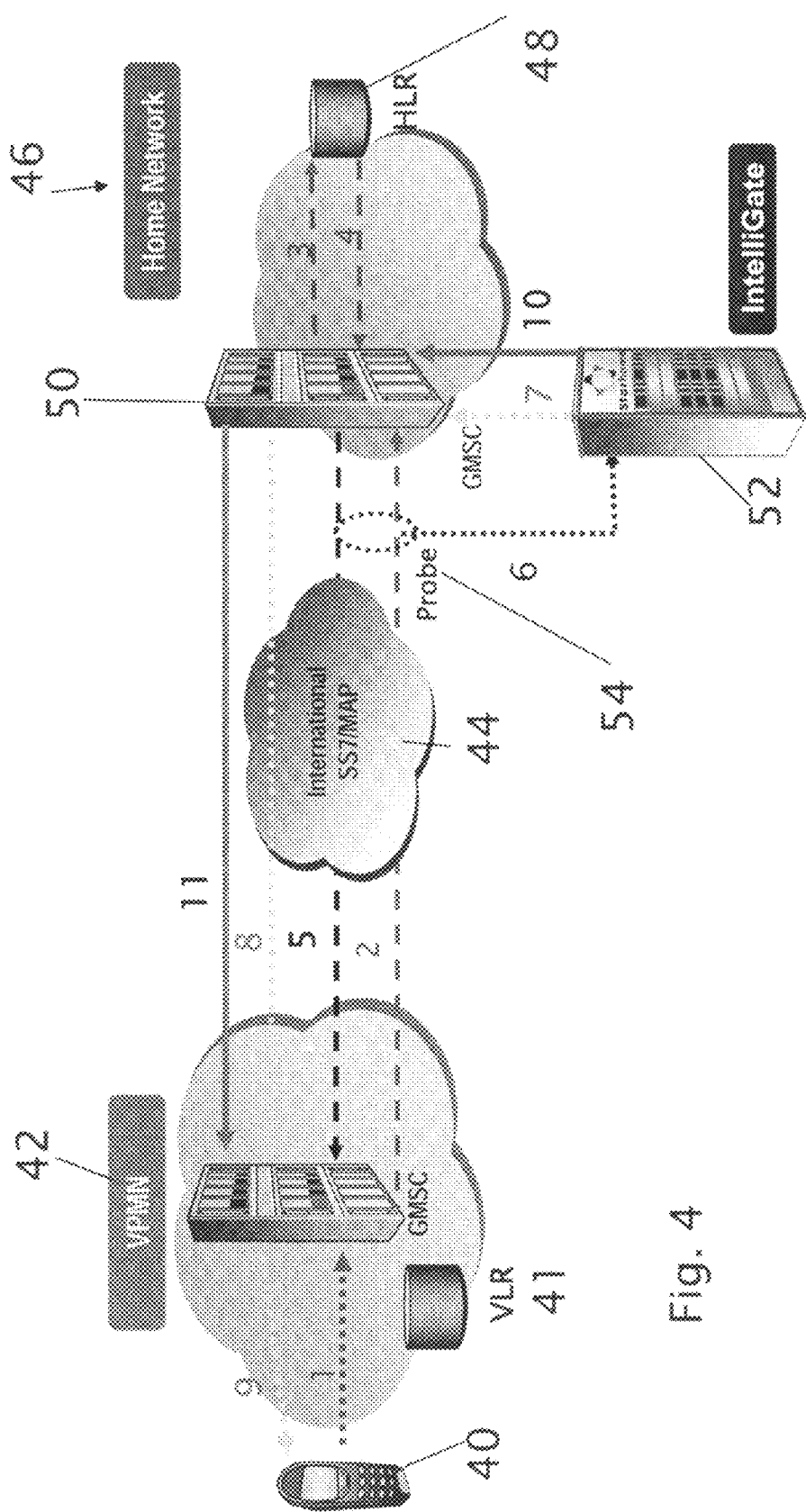
FIGS. 4, 5, 6, and 7A-7B illustrate call flows in different scenarios when placing roaming calls according to various embodiments of the present invention.

The procedure for turning the user from prepaid to postpaid is now explained with respect to FIG. 4. FIG. 4 illustrates a mobile unit 40 registering via visitor location register 41 at roaming network 42. The roaming network 42 is linked by International signaling links 44 to home network 46. Mobile unit 42 has a home location register 48 where its profile is kept, and which is accessed through GMSC 50. Intelligent gateway 52 monitors the International signaling via probe 54.

The following table outlines the main steps in turning a prepaid subscriber into Postpaid while roaming in a non-CAMEL network. The step numbers refer to FIG. 4

TABLE 1

Passive monitoring of LU

| Step | Description |
| --- | --- |
| Step 1 | A visitor attempts to register within a VPMN with no CAMEL, generates a LU Request |
| Step 2, 3 | The LU message arrives at the home HLR |
| Step 4, 5 | The home HLR sends the normal ISD |
| Steps 6 | The IntelliGate analyzes the transaction via the probe and applies service logic |
| Step 7, 8, 9 | The IntelliGate recognizes the user as Prepaid in a Non-Camel network and initiates an SMS to activate the Applets on the SIM. The SIM responds with an ACK to the IntelliGate. |
| Step 10, 11 | The IntelliGate sends a stand alone ISD to the VPMN to update the profile in the VLR from Prepaid to Postpaid |

Call Control Service

The following sections outlines the main features of the SIM toolkit that are utilized by the solution to allow pre-paid roamers to roam in non-CAMEL networks.

The SIM can issue a variety of commands that can be utilized for this solution and examples include the following:
  SEND USSD, which sends a USSD string to the network. This feature can be used to notify the HPMN that the prepaid user has started/ended a call.
  SEND SHORT MESSAGE, which sends a short message or SMS-COMMAND to the network. This feature can be used to notify the HPMN that the prepaid user has started/ended a call.
  SET UP CALL, which initiates a call, disconnecting all other calls (if any). This can be used to disconnect a call if the prepaid users account is out of credit.
  SET UP EVENT LIST where the SIM supplies a list of events which it wants the ME to provide details of when these events happen. These events include—Call Connected and Call Disconnected.

Call Set-UP

Figure 5:
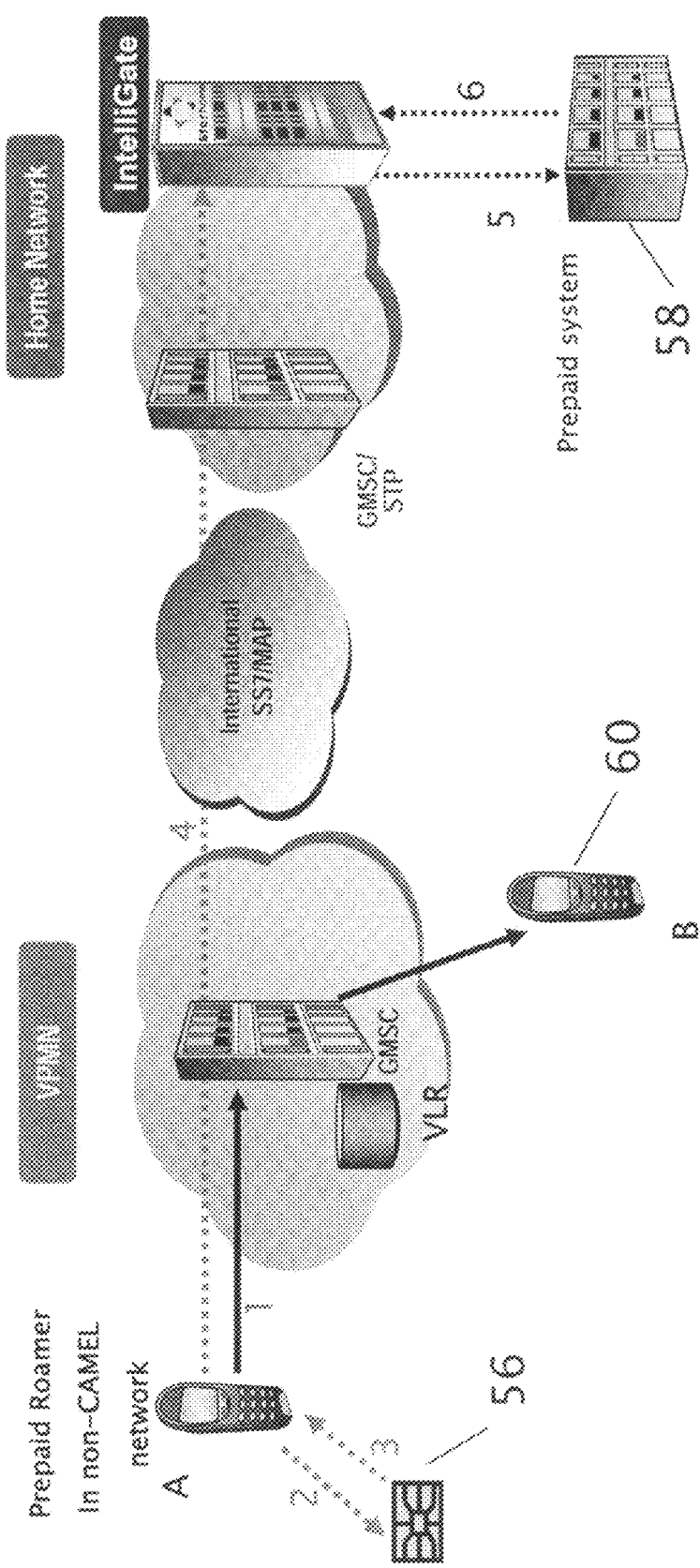

Reference is now made to FIG. 5, which is a simplified diagram illustrating essentially the same arrangement as in FIG. 4, but this time showing the procedure for setting up the call and starting charging. Table 2 outlines the call flow when a prepaid user makes a call in the visited non-CAMEL network. The SIM has been pre-loaded with the applet required. The SIM card of mobile telephone 40 is denoted as 56. The prepaid system of the home network 60 is connected to Intelligate 52, and a call destination 60 or B is shown.

The following table outlines the steps involved when the prepaid roamer makes a call.

TABLE 2

Start Charge

| Step | Description |
| --- | --- |
| Step 1 | A prepaid roamer initiates a call to a B number in the VPMN |
| Step 2 | On CONNECT, the ME sends the call information to the SIM. |
| Steps 3, 4 | The SIM prompts the ME to send a USSD/SMS to the IntelliGate notifying it of the call (transparent to subscriber). |
| Steps 5, 6 | The IntelliGate interfaces with the prepaid system and starts to charge the users account. |

Call Disconnect

Figure 6:
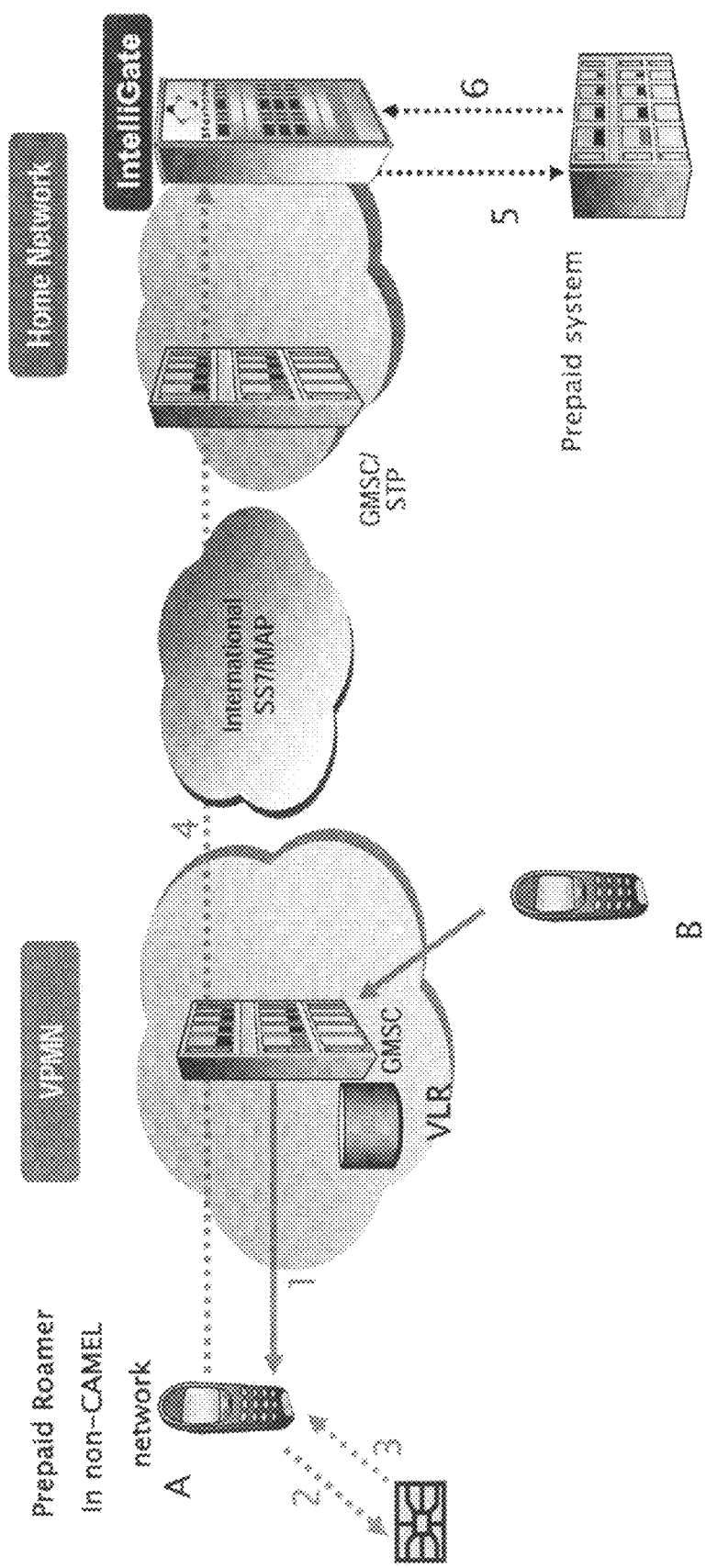

Reference is now made to FIG. 6, which illustrates essentially the same configuration again but this time shows the call disconnect procedure. Table 3 outlines the call flow when a prepaid user disconnects a call in the visited non-CAMEL network, with reference to FIG. 6.

The following table outlines the steps involved when prepaid roamer's calls are disconnected in a non-CAMEL network.

TABLE 3

Stop Charge

| Step | Description |
|---|---|
| Step 1 | Roamer A or called B party disconnect the call |
| Step 2 | On DISCONNECT, the ME sends an EVENT to the SIM. |
| Steps 3, 4 | The SIM prompts the ME to send a USSD/SMS to the IntelliGate notifying it of the disconnected call (transparent to subscriber). |
| Steps 5, 6 | The IntelliGate interfaces with the prepaid system and stops charging the users account. |

No Credit

Figure 7A:
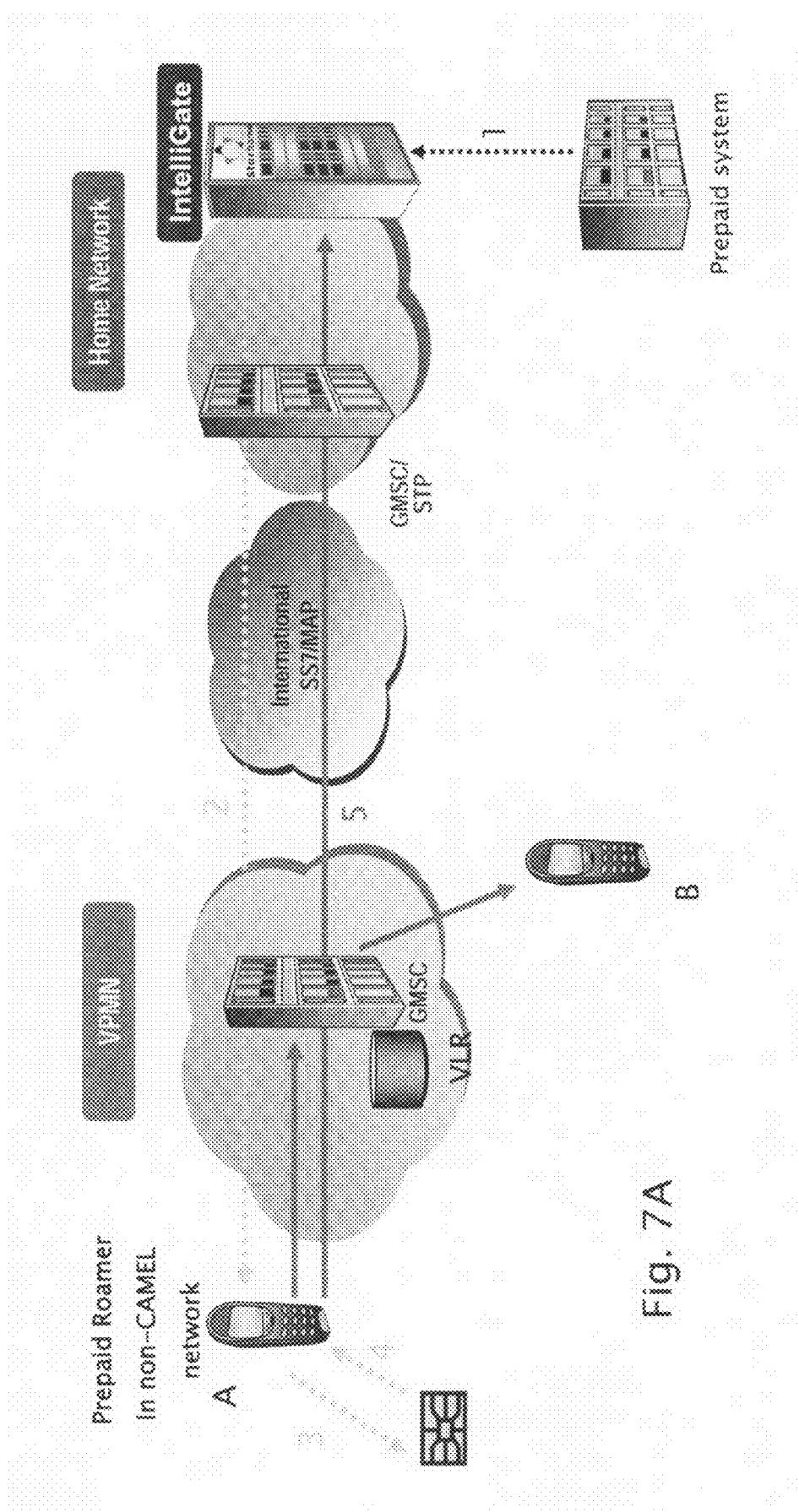

Reference is now made to FIG. 7A, which illustrates the procedure in which the prepaid user reaches his credit limit. The IntelliGate 52 may notify the SIM, transparently, to disconnect the call.

The following table with reference to FIG. 7, outlines the steps involved when a prepaid user, who has been registered as postpaid in the VPMN, runs out of credit in the home prepaid system.

TABLE 4

No Credit

| Step | Description |
|---|---|
| Step 1 | Prepaid Roamer A is in Call with B. The IntelliGate received the Call connected event and passed the call details to the Prepaid system to start charging. The Prepaid system notifies the IntelliGate that the subscriber is out of credit |
| Step 2 | The IntelliGate sends an SMS to the ME initializing the SIM applet call control features. Transparent to the end-user. |
| Step 3 | The SIM receives the SMS and initiates the CALL CONTROL Feature. This tells the ME to disconnect all calls and connect to a specified number |
| Step 4 | The existing call is disconnected |
| Step 5 | The ME connects to the IG to play a prompt telling the user they have reached their credit limit |

Figure 7B:
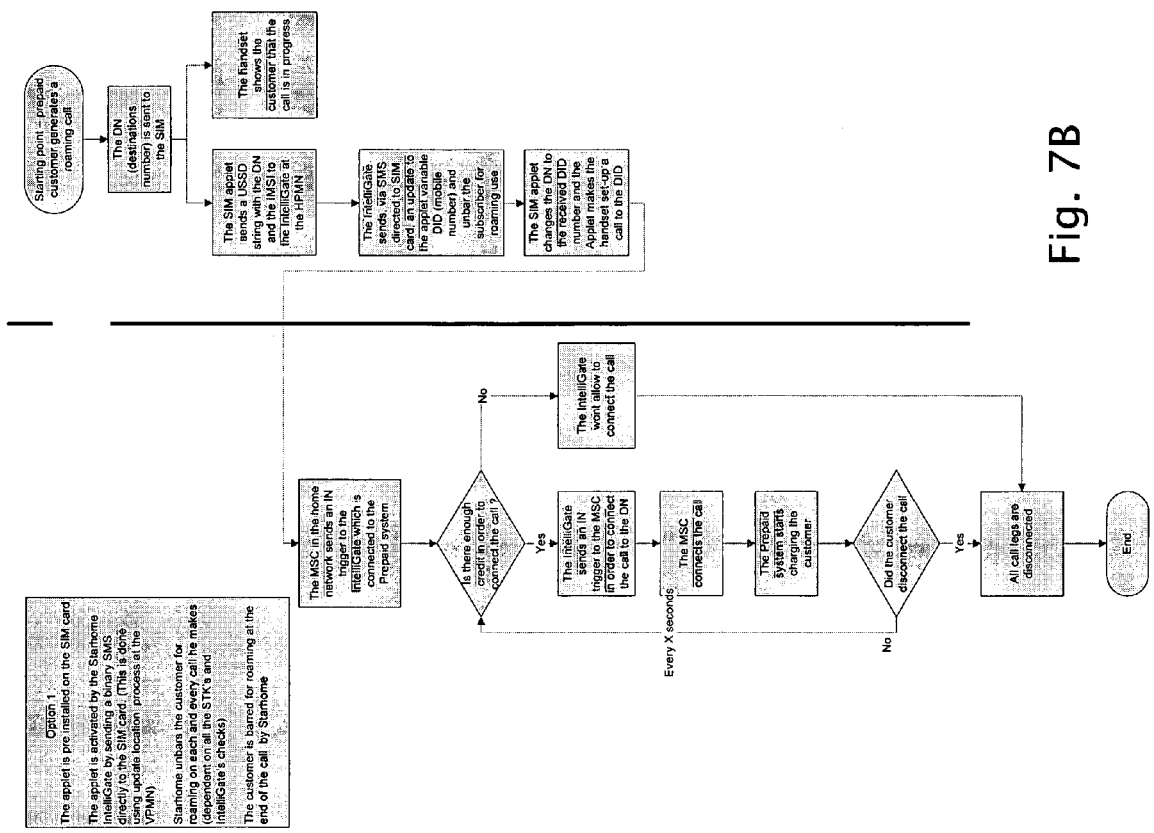

Reference is now made to FIG. 7B, in which is illustrated the embodiment in which call barring is removed per call, and restored at the end of the individual call.

Initial placement of the call is as above.

The barring for international calls is not removed in general for the prepaid user, but only per call. When a user is making a call:

a. The SIM applet takes control, and sends a USSD (or other means, an SMS or an SS7 signal) to the home network, with the original dialed number. It also disconnects the original call.

b. At this point the home server removes the "barring for international" indication from the visited network VLR (using the MAP ISD command).

c. The home server allocates a DID for this call, a per-call DID, and sends the allocated number to the SIM applet, via binary SMS (or other means).

d. The SIM applet now places a new call (instead of the disconnected call) to the DID.

e. The home server receives the call, and routes it to its final destination according to the information received in the previous USSD—while handling the prepaid on-line charging of course.

f. After the call is completed, the home server restores the "barring for international" to the VLR. Thus the user is always barred for making calls, except when the SIM toolkit is able to take control of the call, and to send a USSD to the home network.

SIM Applet Security

Security of the SIM applet is a concern in this solution and is addressed by the standards for smartcards.

Figure 8:
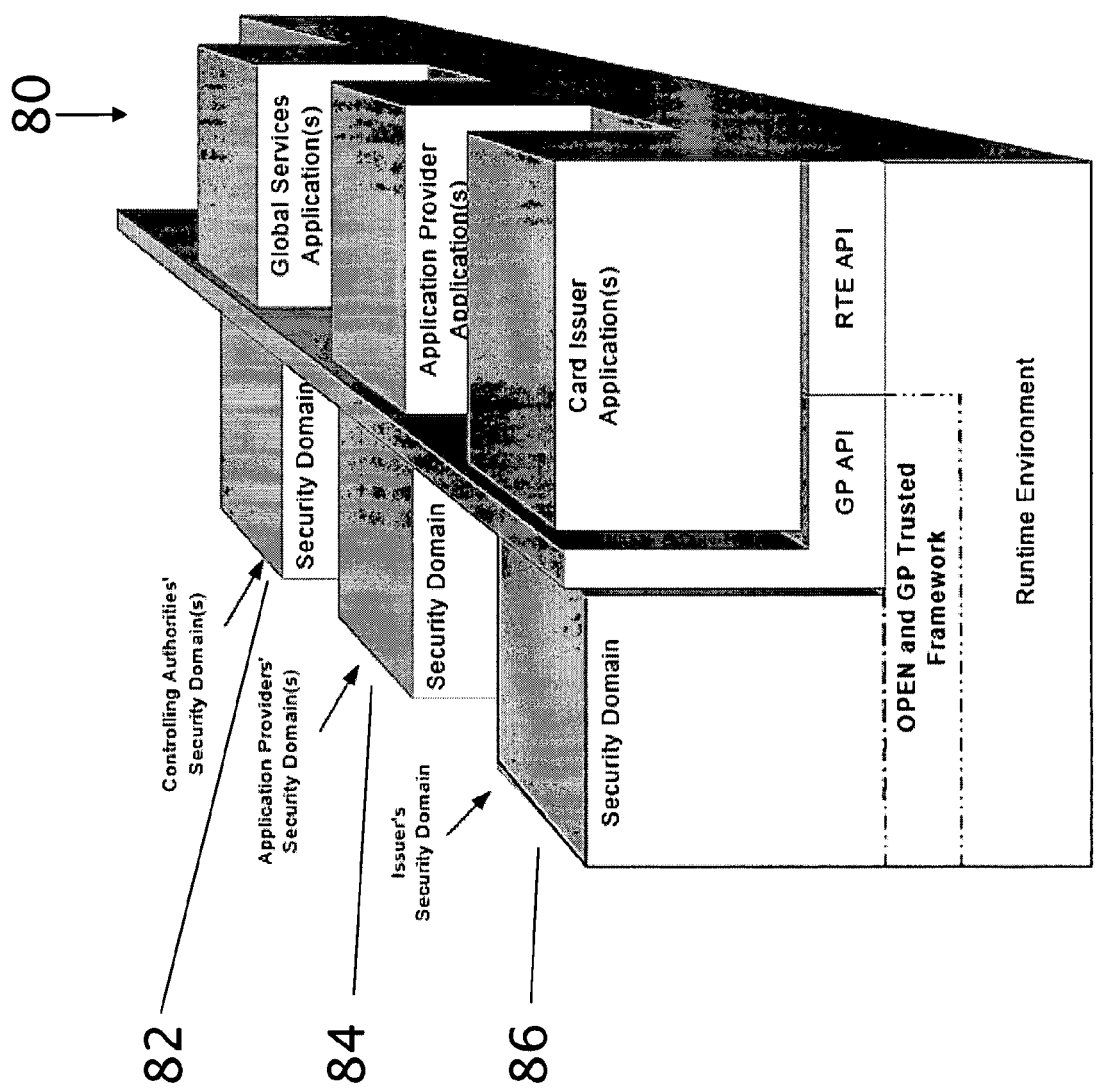
FIG. 8 is a simplified schematic illustration of the SIM card illustrating security aspects of the card and showing how a SIM app has to fit within one of the security domains.
Figure 9:
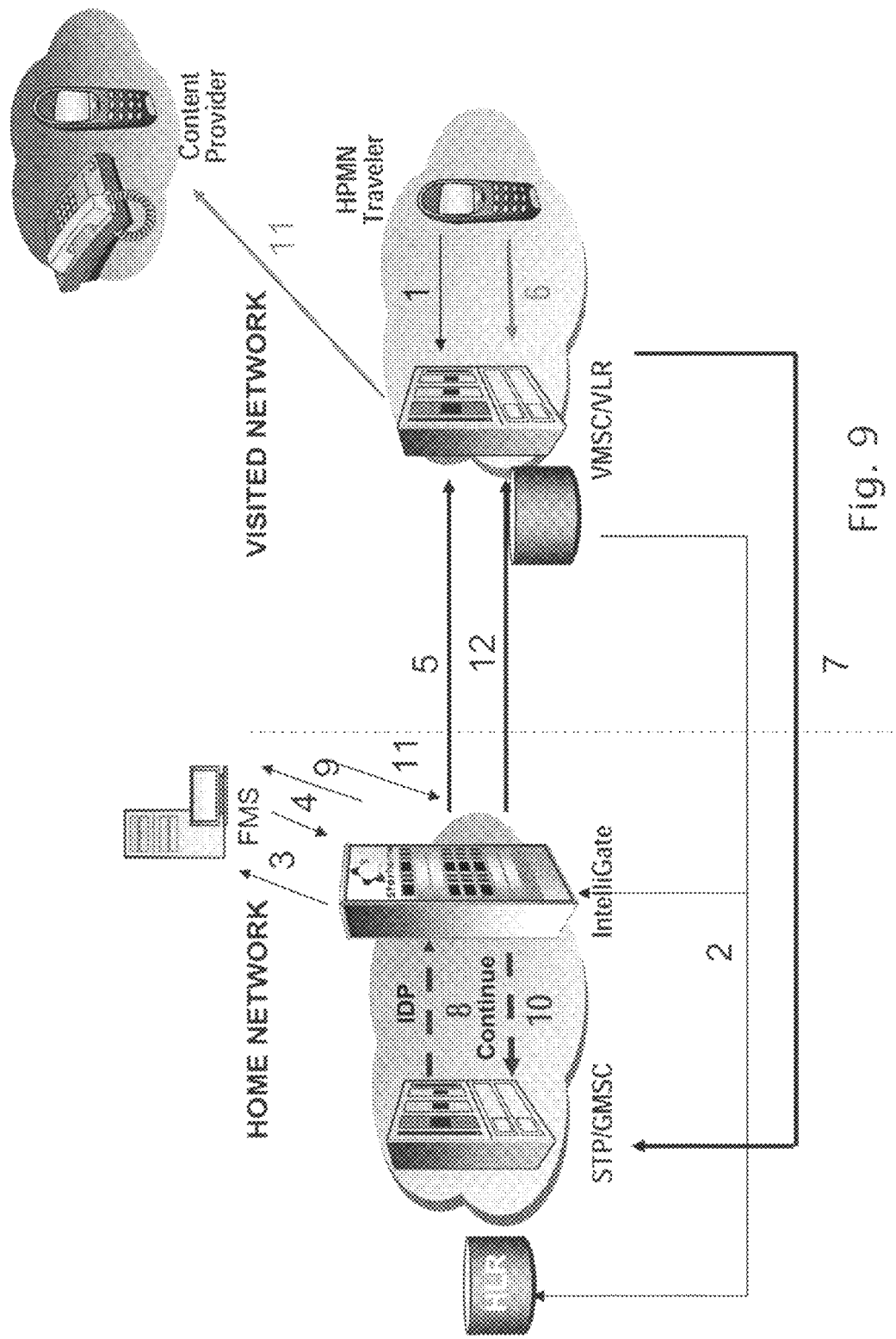
FIGS. 9-12 are additional call flows illustrating different scenarios when placing roaming calls according to various embodiments of the present invention.

The SIM card architecture is comprised of a number of components that ensure hardware and vendor neutral interfaces to Applications and off-card management systems. This architecture includes security domains as in FIG. 8 which is a system domain block diagram of the SIM card. As shown in FIG. 8, three security domains are provided on the SIM architecture 80. These are the security domain of the controlling authority, 82, of the application provider, 84 and of the issuer, 86.

The Security Domains support security services such as key handling, encryption, decryption, digital signature generation and verification for their providers' (e.g. Card Issuer, Application Provider or Controlling Authority) applications.

Thus, any application, before it can be loaded or initialized on the SIM, is required to verify itself with a security key pre-defined in one of the security domains.

IntelliGate Roaming Service Delivery Platform (R-SDP)

The Intelligate has been mentioned above. The present embodiments may conveniently be implemented using dedicated IntelliGate R-SDP 52 which is used for development, deployment, delivery, and management of voice and data roaming services for mobile network operators.

The IntelliGate 52 is preferably an ISO-9001 compliant, Telco-grade cabinet incorporating standard servers, communication modules and rack hardware with proprietary roaming applications and middleware. It provides roaming services over a wide range of media, such as voice, IP, and SMS data, and interfaces to mobile networks via SS7 links (MAP/ISUP/CAP/INAP).

The software architecture integrates shared roaming building blocks with core telephony units, roaming applications, network and signaling interfaces, and database layers. Complete processor capabilities provide interoperability with operators' operations, billing and back-office systems.

Referring again to FIG. 2 the embodiment for allowing SMS while barring voice calls is now discussed in more detail. The embodiment may stop roamers from placing calls while allowing SMS, and may do this in both CAMEL enabled and non-CAMEL networks.

If the roaming network has a CAMEL enabled network then the IntelliGate platform may act as an SCP node for the outbound roamer, enabling the IntelliGate to control the outbound roamers calls.

In non-CAMEL networks the Intelligate platform may utilize features available on the SIM toolkit to control outbound roamer calls.

Both of the above solutions require the subscriber, whether prepaid or postpaid, to be identified as a roamer. The IntelliGate platform can do this by monitoring the Location Updates (LU) coming from roamers as they try to register to the mobile networks in the countries they are visiting, as with the previous embodiment.

The following sections will outline two methods for allowing SMS while barring voice calls.

SIM Toolkit Enabled Barring

The SIM toolkit feature-set enables the home network to control MO (Mobile Originated) telephony calls placed by its subscribers, while roaming in a visited mobile network. The main purpose of the SIM toolkit is to benefit both the subscriber and the operator by providing extra functionality. For the operator this means they have a method to control the calls of their subscribers without having to have direct access to the handset.

The IntelliGate platform may passively monitor the home operator's international MAP links for the Location Updates (LU) coming from roamers as they try to register to the mobile networks in the countries they are visiting.

If the Location Update (LU) is successful and the HLR returns an ISD to the VPMN, then The IntelliGate may check the ISD to see if the roamer is barred from making calls. If the roamer is barred the IntelliGate may first of all send a stand-alone ISD to the VLR activating the subscriber for calls (which will also activate them for SMS). At the same time the IntelliGate may verify or activate the SIM applet(s) on the roamer's telephone. Such SIM applets are then responsible for disabling the roamers calls.

SIM Toolkit Features

Call control is a feature of the SIM toolkit that may be utilized by the solution to allow pre-paid roamers to roam in non-CAMEL networks. When the service is activated by the SIM, all dialed digit strings are first passed to the SIM before the ME sets up the call. The SIM has the ability to allow, bar or modify the call.

Call Flow

Figure 10:
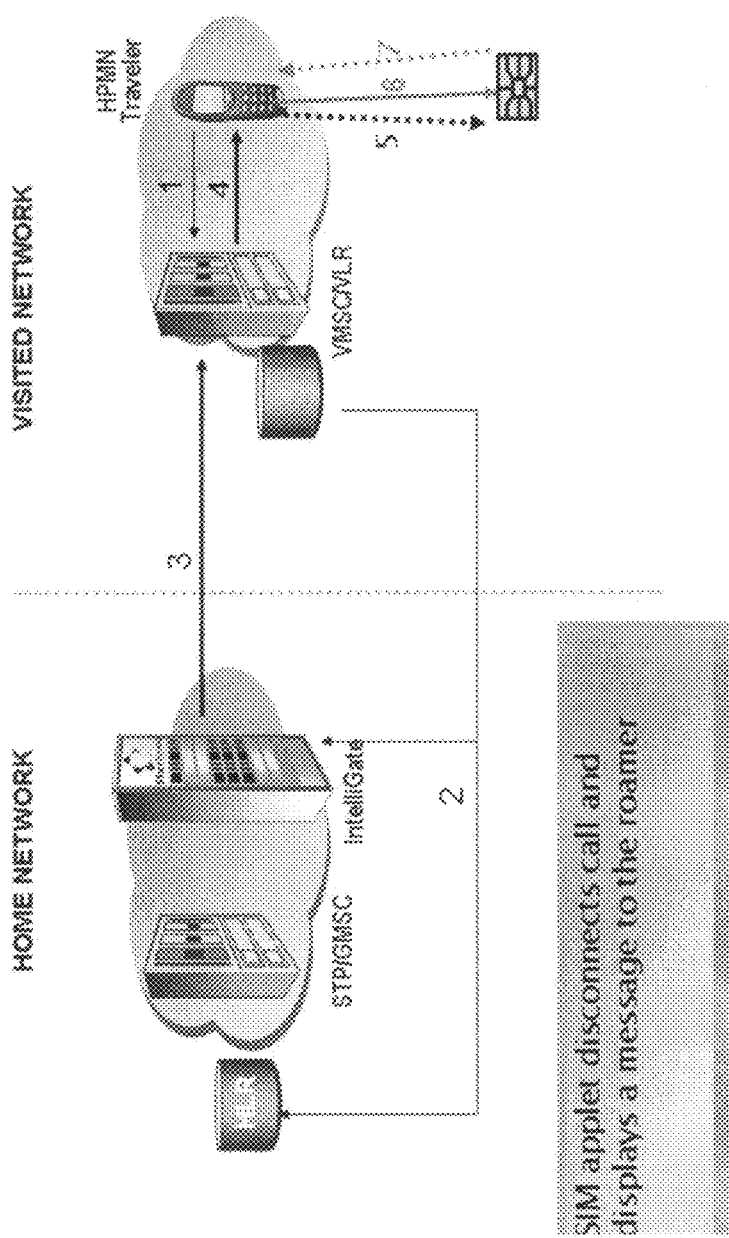

With reference to FIG. 10, Table 4 below outlines the call flow procedure.

TABLE 4

| SIM toolkit Call flow | |
|---|---|
| Step 1 | Roamer registers to VPMN |
| Step 2 | VLR sends UL (Update Location) toward HLR - Intercepted by Call Barring platform at HPMN |
| Step 3, 4, 5 | Call Barring verifies/activates SIM applet on the roamers terminal |
| Step 6 | Mobile initiates a call and the call details are sent to the SIM applet |
| Steps 7 | SIM applet disconnects the call |

CAMEL Enabled Barring

Figure 11:
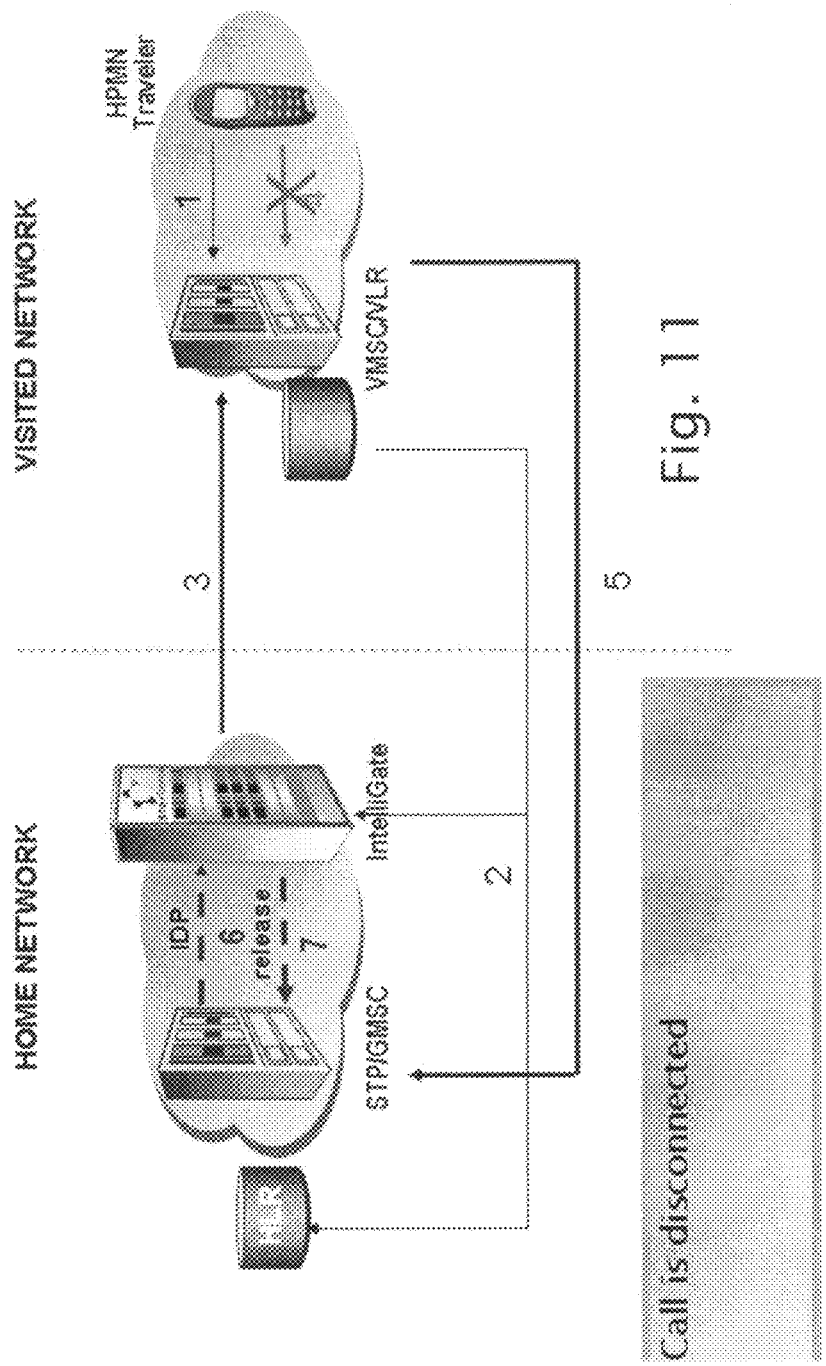

Reference is now made to FIG. 11, which illustrates the call flow in the event of a call which is to be barred. The GSM CAMEL infrastructure enables the home network to control MO (Mobile Originated) telephony calls placed by its subscribers, while roaming in a visited mobile network. The main purpose of the GSM CAMEL infrastructure is to enable networks to offer features of home-oriented services such as roaming prepaid or VPN.

As of today, a majority of prominent GSM networks have installed the CAMEL extension in their switches, making it the de facto Roaming IN technology. Consequently these GSM networks have CAMEL roaming agreements in place between them. The CAMEL settings (triggers) are configured for all roaming subscribers, or for prepaid roaming subscribers, depending on the required services.

The Call Barring solution utilizes the CAMEL infrastructure to configure CAMEL triggers. The CAMEL triggers transfer call control to the HPMN where the call is controlled by the IntelliGate platform. The system can then disconnect any calls a Roamer tries to make. The roamer will however, still be able to send SMS messages, which are not barred.

The CAMEL trigger is configured by the Call Barring service using the ISD (Insert_Subscriber_Data) MAP command. The Call Barring service therefore needs the ability to issue MAP commands, i.e. act as a signaling point in the SS7 network, and has a MAP link connected.

In general, the ISD command downloads a subscriber profile from the HLR to the serving VLR. For setting a CAMEL trigger at the roaming VLR, the ISD message may include the O-CSI field, defining the home SCP address, along with other relevant details. The SCP home address for the trigger is defined to be the Call Barring platform.

From here on, whenever the roamer places an MO call, a CAMEL event is sent from the serving MSC in the visited network to the home network SCP (the Call Barring Platform in this case), which can discontinue the call.

The call flow under CAMEL control is illustrated in FIG. 11 and as described in table 5 below.

TABLE 5

| CAMEL controlled call flow | |
|---|---|
| Step 1 | Roamer registers to VPMN |
| Step 2 | VLR sends UL (Update Location) toward HLR - Intercepted by Call Barring platform at HPMN |
| Step 3 | Call Barring sends updated ISD containing its own SCP address in the O-SCI field to the VLR for the roamer. |
| Step 4 | Mobile initiates a call |
| Steps 5, 6 | CAMEL IDP event is sent to Call Barring, acting as SCP, via home GMSC |
| Step 7 | Call Barring systems next action: release |
| Steps 8 | Call is disconnected |

The call barring system may include some of the following features:

The IntelliGate can operate in passive mode architecture, that is passively probing to detect the LU and ISD messages The IntelliGate can operate in active mode when serving as the SCP for outbound roamers. If a CAMEL trigger for roamers is occupied (e.g. Prepaid) and the Call Barring cannot act as the SCP, then CAMEL monitoring probes can be implemented as part of the solution.

GUI for service provisioning—e.g. defining VPMNs that only SMS will be allowed for.

Counters for report generation.

SNMP traps for service and system monitoring

Flexible interface for subscriber insertion or deletion (support of ASCII file, XML etc')

Dynamic updates with no down time both for subscriber addition/deletion and VPMN Generally, operators are very cautious when it comes to roaming. Roaming fraud is on the increase and therefore Operators like to know that not all their subscribers are capable of making calls while roaming. However, barring subscribers from making voice calls also stops them from using SMS which in effect makes their mobile phone useless when traveling.

Call Barring according to the present embodiments allows operators to give their subscribers the satisfaction that, while abroad, they will be able to send SMS to keep in contact with people. This is a vital service which is has benefits for both the Operator and the roamer.

The above embodiments have described a service that enables prepaid roaming by providing the home operator with all the necessary information to control and charge their outbound prepaid roamers. The service utilizes the IntelliGate Roaming Service Delivery Platform which is also the providing platform for other roaming services, including Intelligent Call Assistant (ICA) type services in which incorrect or partially dialed numbers can be completed, and Home Short Code which allows dialing short codes recognized at the user's home network to be recognized while roaming. Another service is CLI delivery, the secure delivery of the caller's telephone number to the destination network, needed to show the callee who is calling and to access voicemail and the like.

Figure 12:
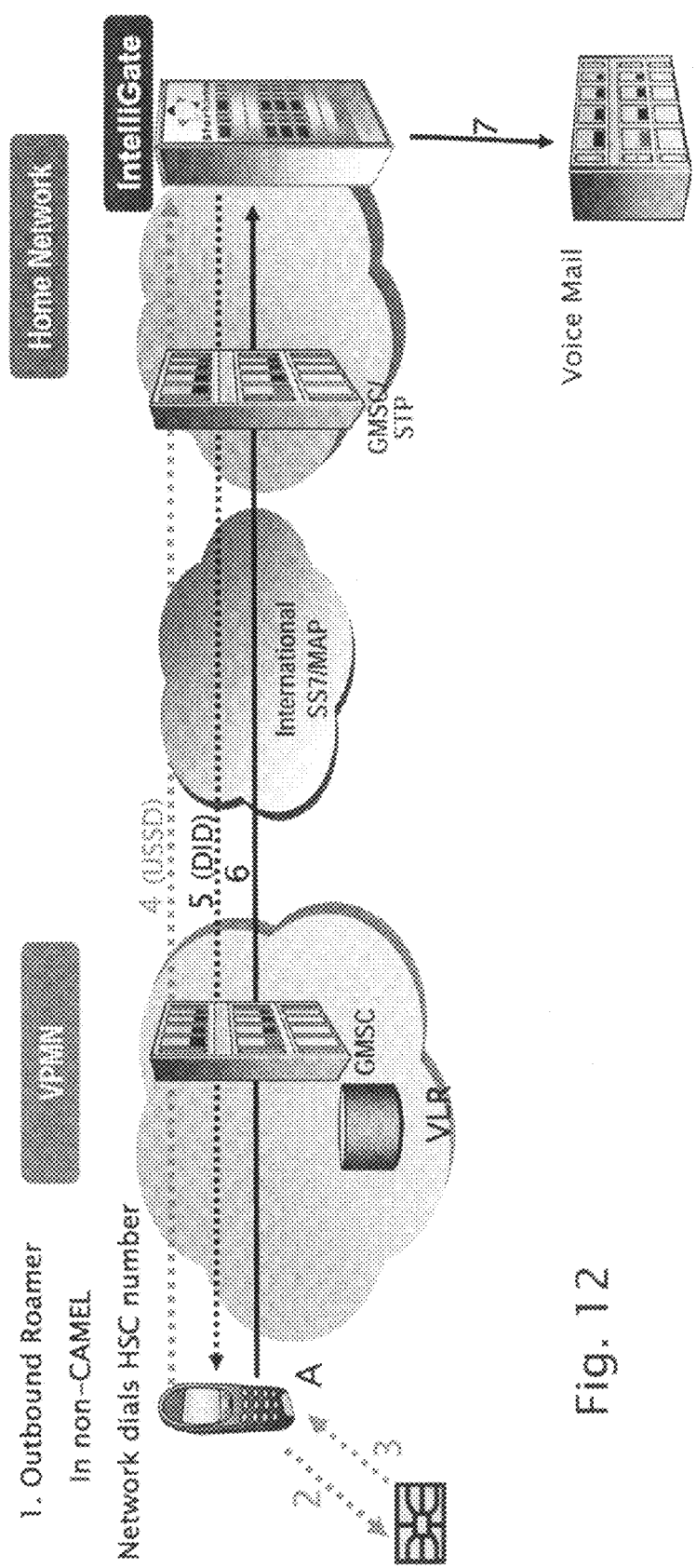

Reference is now made to FIG. 12, which illustrates voicemail access by a prepaid roaming user. The user dials the home network's short code to the voicemail system. The call is intercepted by the client as before and the dialed number is replaced by the DID. The call is forwarded to the home Intelligate where the prepaid system is checked as before. Then the call is forwarded to the final destination, the user's voicemail, using the user's CLI, which is delivered alongside the call to the home intelligate.

For ICA and HSC services as described above, the implementation is simpler. There is no need for DID routing and CLI delivery, only for number translation at the SIM.

In addition to the above, client based embodiments, there is an additional embodiment known as callback, in which a Prepaid Roamer dials a prefix before the number they wish to call. The prefix initiates a Feature Request to the IntelliGate (IG) in the home network. The IG checks/charges the prepaid account and if credit is available the IG calls back to the roamer while connecting the call to the dialed number.

Alternative to the SIM Toolbox Client

In the above a SIM Toolbox based client was described. However it is also possible to use a R-UIM CAT or BREW applet. That is to say one can use a R-UIM applet, in the case of R-UIM CAT capable mobile terminals, or BREW application, in BREW capable terminals, to forward call details to the IntelliGate in the home network. The IntelliGate can then use the call details to check/charge a prepaid account, in accordance with any of the methods described above. If enough credit is available the R-UIM applet is instructed to connect the call, while the BREW application receives a callback and seamlessly connects the call without the roamers interaction.

As before, the service supports at least some of the following features:

GUI for service provisioning (list of supported VPMNs and subscribers).
Counters for report generation.
SNMP traps for service and system monitoring.
VPMN definition for service activation.
Flexible interface for modifying subscriber information (supports ASCII, XML, and other file types).

In order to use the system the IntelliGate keeps a database of visited networks that do and do not require the service, hereinafter VPMN DB, that is provisioned by the operator. On receiving Registration Notification (REGNOT) the IntelliGate checks if the service is required. If the visited network is not in the VPMN DB nothing is done. If, on the other hand, the visited network is in the VPMN DB, the IntelliGate activates the R-UIM applet on the Roamer's R-UIM. Consequently, using the R-UIM toolkit and DID, all calls are re-routed to the IntelliGate in the HPMN.

In order to use the system, roamers must install a BREW application on their mobile telephones before going abroad. The user then accesses the BREW application and enters in the phone number they want to dial. The BREW application makes a Feature Request call with the dialed number to the IntelliGate (IG) in the HPMN. The IG gets the string and checks the prepaid account and if there is enough credit the IG makes a CALL BACK to the BREW handset and at the same time connects the B number. The BREW application receives the callback and answers immediately so the end user does not realize that a callback has been made.

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A Client for inclusion in a mobile telephony apparatus barred from international roaming usage, to remove said barring to allow roaming operation thereof according to conditions determined at a home network, the client being configured with an activation unit and a call control unit, said activation unit configured to switch said client between active and passive states, and said call control unit, operative in said active state, to communicate through said client within said mobile telephony apparatus with a predetermined barring removal node at said home network, to remove said barring at said roaming network according to determined conditions of said home network, and to facilitate control of said mobile telephony apparatus using said home network, the communication causing said barring to be removed for a duration of a setup of a call, and further causing said barring to be set again after the call is established.

2. The client of claim 1, wherein said call control unit is configured to replace a dialed number with a predetermined number, said predetermined number being that of said predetermined barring removal node, thereby to forward a current call to a predetermined location.

3. The client of claim 2, wherein said call control unit is further configured to send said dialed number in a communication separate from said call to said predetermined barring removal node, thereby to allow said predetermined barring removal node to forward said call using said dialed number.

4. The client of claim 3, wherein said call control unit is configured to send said separate communication first and forward said call subsequently.

5. The client of claim 1, wherein said communications comprise triggers indicating call status.

6. The client of claim 5, wherein said triggers are usable for operating a prepaid system associated with a roaming gateway, thereby to enable said conditions to be determined by said prepaid system.

7. The client of claim 6, wherein said communications further comprise an indication to said roaming gateway to remove a bar to international dialing from said mobile telephony apparatus.

8. The client of claim 3, wherein said separate communication comprises at least one member of the group comprising: text messaging, a USSD message and an SS7 control signal.

9. The client of claim 1, being one member of the group comprising: a SIM toolkit application, a Symbian application, a Brew application, a Microsoft Mobile application, and a Linux application.

10. The client of claim 1, being mounted in a SIM card of the mobile telephony apparatus.

11. The client of claim 1, further configured to affirm said barring of calls at said roaming network but to allow text messaging.

12. The client of claim 1, configured such as to provide CAMEL emulation signaling, thereby to allow prepaid control from a home network at a non-CAMEL enabled roaming network.

13. A Home network roaming user apparatus, for call control of roaming users, the apparatus comprising:
a status switching unit being a part of said home network, usable in association with roaming users in a roaming mobile network, some of said roaming users having a call control client co-located with said users at said roaming network, the status switching unit configured to switch an international call barring status at said home network of a mobile telephony unit determined to have said call control client, and
a network call control unit at said home network, configured to apply control to a call placed by said mobile telephony unit based on signaling received from said call control client co-located with a respective one of said users at a corresponding roaming network, wherein said call control unit is configured to remove said call barring status for a duration of a setup of a call and to reset said call barring status following said setup of said call.

14. The Apparatus according to claim 13, further comprising a triggering unit configured for triggering call control clients of mobile telephony units detected to be roaming, to place said clients in an active state.

15. The Apparatus according to claim 13, wherein said signaling comprises a communication sent by said call control client in association with but separately from a call placed at said mobile telephony unit.

16. The Apparatus according to claim 13, wherein said call control unit is configured to communicate with a prepaid system at said home network to allow said prepaid system to control said call to continue said call only as long as a credit balance remains.

17. The Apparatus according to claim 13, wherein said status switching unit is configured to switch said status initially when said roaming status is detected to allow international calling throughout a roaming duration.

18. The Apparatus according to claim 13, wherein said status switching unit is configured to switch said status to allow international calling only for the duration of a current call.

19. The Apparatus according to claim 16, wherein said signaling comprises predetermined triggers and said call control unit is configured to relay said triggers to said prepaid system.

20. The Apparatus according to claim 13, wherein said signaling comprises a communication with dialing information, and said call control unit is configured to use said dialing information to forward a call to a destination defined in said dialing information.

21. The Apparatus according to claim 13, wherein said status switching unit is configured to switch said status by adding or removing an indication from a profile associated at said home network with said mobile telephony unit.

22. The Apparatus according to claim 21, wherein said indication is an indication that said mobile telephony unit is a prepaid unit.

23. The Apparatus according to claim 22, wherein said status switching unit is configured to carry out said switching via a prepaid system associated with said home network.

24. The Apparatus according to claim 13, further comprising a client uploading unit for automatic uploading of a call control client to said mobile telephony unit.

25. A Method for controlling roaming mobile telephony devices comprising:
detecting placement at said roaming mobile telephony device of a call, said detecting being made at a call control client of said roaming mobile telephony device;
in response to said detecting, sending from said call control client to a predetermined address at a home network of said mobile telephony device information regarding said call, said information used at said home network to limit a duration of said call in accordance with user data held at said home network, said predetermined address being a call barring node of said home network, said limiting comprising lifting a bar at said home network on international calling from said roaming telephony device for a time corresponding to said duration and resetting said call barring status following said setup of said call.

26. The method of claim 25, further comprising forwarding said call to said predetermined address, said information comprising a dialed destination number to enable said home network to forward said call to said dialed destination.

27. The method of claim 26, wherein said information comprises a request to rescind a bar on international calling.

28. The method of claim 27, wherein said request is limited to the duration of said call.

29. The method of claim 28, wherein said forwarding of the call is delayed with respect to forwarding of said information.

30. The method of claim 25, wherein said information comprises a CAMEL compatible trigger.

31. The method of claim 25, wherein said information is for allowing said home network to operate a home network prepaid system based thereon.

* * * * *